United States Patent
Sugiyama et al.

(10) Patent No.: US 6,634,725 B2
(45) Date of Patent: Oct. 21, 2003

(54) CRAWLER

(75) Inventors: Genroku Sugiyama, Miho (JP); Wataru Idetsu, Chiyoda (JP); Akihiko Yamamoto, Chiyoda (JP); Yuji Yoshitomi, Chiyoda (JP); Akiomi Kono, Tomobe (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/169,996

(22) PCT Filed: Nov. 22, 2001

(86) PCT No.: PCT/JP01/10248
§ 371 (c)(1),
(2), (4) Date: Jul. 12, 2002

(87) PCT Pub. No.: WO02/051691
PCT Pub. Date: Jul. 4, 2002

(65) Prior Publication Data
US 2003/0000747 A1 Jan. 2, 2003

(30) Foreign Application Priority Data
Dec. 22, 2000 (JP) ........................................ 2000-391308

(51) Int. Cl.$^7$ ............................................... B62D 25/16
(52) U.S. Cl. ........................................ 305/103; 305/101
(58) Field of Search ................................ 305/102, 103, 305/104, 105, 106, 101; 180/9.1

(56) References Cited

U.S. PATENT DOCUMENTS

| | | | | |
|---|---|---|---|---|
| 4,094,514 A | * | 6/1978 | Johnson | 305/103 |
| 4,126,359 A | * | 11/1978 | Holze | 305/118 |
| 4,392,657 A | * | 7/1983 | Roley | 277/383 |
| 5,711,586 A | * | 1/1998 | Anderton et al. | 305/201 |
| 5,763,956 A | * | 6/1998 | Metz et al. | 305/102 |
| 6,102,408 A | * | 8/2000 | Anderton et al. | 277/370 |
| 6,105,969 A | * | 8/2000 | Anderton et al. | 277/405 |
| 6,406,029 B1 | * | 6/2002 | Kupper et al. | 277/383 |
| 6,478,388 B2 | * | 11/2002 | Maguire | 305/103 |

FOREIGN PATENT DOCUMENTS

| | | |
|---|---|---|
| JP | 48-62135 | 8/1973 |
| JP | 51-119235 | 9/1976 |
| JP | 60-97679 | 7/1985 |
| JP | 63-6985 | 1/1988 |
| JP | 7-285472 | 10/1995 |

* cited by examiner

Primary Examiner—S. Joseph Morano
Assistant Examiner—Long Bao Nguyen
(74) Attorney, Agent, or Firm—Mattingly, Stanger & Malur, P.C.

(57) ABSTRACT

Hardened surface layers (12) and (14) of a nitride or other compound, which is higher in hardness than dirt or soil, are formed on the inner peripheral surface (11B) of each metal bush (11) and on the outer peripheral surface (13A) of each connecting pin (13) which constitute a crawler belt (7), respectively. In addition, resinous sliding bearings (15) are fitted in transversely spaced positions on the inner periphery of each metal bush (11) of the crawler belt. Bearing (15) is provided with recessed grooves (16). Accordingly, part of soil or dirt which intrudes into a gap space between an outer link portion (9) of a track link and a metal bush (11) through an annular seal member (17) is trapped on an inner peripheral surface (15A) of the bearing (15).

11 Claims, 8 Drawing Sheets

CRAWLER

TECHNICAL FIELD

This invention relates to a crawler belt suitable for use on crawler type vehicles, for example, on hydraulic excavators, hydraulic cranes and the like.

BACKGROUND ART

Generally, crawler belts which are used on crawler type vehicles such as hydraulic excavator and the like are largely constituted by rows of endlessly connected right and left track links each formed with an outer link portion and an inner link portion at longitudinally opposite ends, respectively, bushes located transversely between the right and left track links in such a way as to connect inner link portions of the respective track links with each other, connecting pins placed in the respective bushes and each having opposite ends thereof coupled with the outer link portions of the track links by fitting engagement therewith, and seal members provided on the outer peripheral side of the connecting pins between an outer link portion of a track link and a bush.

The prior art crawler belt of this sort is lapped around an idler wheel and a drive sprocket and rolled on in the forward or backward direction between and around the idler wheel and drive sprocket by a drive means such as hydraulic motor or the like to drive a vehicle body in a forward or reverse direction.

In order to prevent intrusion of soil or dust into gap spaces between bushes and connecting pins, it has been known in the art to provide an annular seal member of rubber or the like between an outer link portion of each track link and a bush (e.g., as disclosed in Japanese Patent Laid-Open No. H7-285472).

In the case of the prior art crawler belt seal as disclosed in the above-mentioned Japanese Patent Laid-Open No. H7-285472, a gap space between an outer link portion of a track link and a bush is sealed up by a seal member, thereby preventing dirt or other foreign matter from getting between bush and connecting pin.

However, once dirt gets into contacting surfaces of the seal member and bush, for example, it can accelerate abrasive wear of the contacting surfaces of these members to lower the seal effects of the seal member.

Besides, in such a case, there also arises a problem that, through a seal member, dirt can get into a gap space between a bush and a connecting pin to accelerate abrasive wear to inner peripheral surfaces of the bush and/or to outer peripheral surfaces of the connecting pin.

Further, dirt which has intruded into a gap space between a bush and a connecting pin tends to accumulate in the gap without being discharged to the outside, to hinder smooth relative rotations of the bush and connecting pin as well as smooth movements of the crawler belt.

DISCLOSURE OF THE INVENTION

In view of the above-discussed problems with the prior art, it is an object of the present invention to provide a crawler belt which can prevent soil or other foreign matter from getting into gap spaces or clearances between bushes and connecting pins of the crawler belt from outside, preventing abrasive wear of and damages to sliding surfaces of bushes and connecting pins which would be caused by the intrusion of foreign matter.

It is another object of the present invention to provide a crawler belt which can prevent accumulation of soil or other foreign matter in gap spaces or clearances between bushes and connecting pins of the crawler belt to ensure smooth relative rotational movements of the bushes and connecting pins over a long period of time.

In order to solve the above-discussed problems with the prior art, the present invention contemplates to provide a crawler belt of the sort which includes: endlessly connected right and left track links each formed with an outer link portion and an inner link portion at opposite longitudinal ends thereof; bushes transversely located between the right and left track links in such a way as to connect inner link portions of the respective track links with each other; connecting pins inserted in the bushes and having opposite end portions fitted in and connected to the outer link portions of the respective track links; and seal members fitted on the circumference of the connecting pins at positions between the outer link portions of the track links and the bushes.

The crawler belt according to the present invention is characterized by the provision of: a sliding bearing receptacle groove provided on and around an inner peripheral surface of each bush, and said sliding bearing receptacle groove having a diameter larger than said inner peripheral surface; a hardened surface layer provided at least on an inner peripheral surface of the bush or on an outer peripheral surface of the connecting pin to impart higher hardness thereto; and a resinous sliding bearing formed of a tubular synthetic resin material lower in hardness than the bush and fitted in the sliding bearing receptacle groove of the bush, the resinous sliding bearing having a slide surface on the inner peripheral side thereof in sliding contact with the connecting pin.

With the arrangements just described, by the resinous sliding bearing which is fitted in the sliding bearing receptacle groove on the inner peripheral surface of the bush, dirt or soil which gets between an outer link portion and a bush through the seal member during a vehicular driving operation of the machine can be trapped in an embedded state on the resinous sliding bearing which is lower in hardness than the bush, precluding a problem of soil accumulation on or between sliding surfaces of the bush and connecting pin. Besides, the hardened surface layer which is higher in hardness than intruding soil can prevent abrasive wear of the bush or connecting pin and enhance durability of these parts even if small fragments of soil get between them.

According to a preferred form of the present invention, the sliding bearing receptacle groove is provided at least in right and left end portions on the inner periphery of the bush, and the resinous sliding bearing is fitted in each one of right and left sliding bearing receptacle grooves. With the arrangements just described, the resinous sliding bearing can be located in right and left end portions of the bush thereby to prevent soil from entering a gap space or clearance between the bush and the connecting pin from outside.

Further, according to another preferred form of the present invention, the resinous sliding bearing is provided with recessed grooves on the inner peripheral side thereof for trapping therein foreign matter coming in from outside. Therefore, soil which has intruded into a gap space between an outer link portion and a bush can be trapped in the recessed grooves on the inner periphery of the sliding bearing to prevent same from getting between the bush and connecting pin.

Further, according to still another preferred form of the present invention, a plural number of the recessed grooves are provided at intervals around the inner periphery of the resinous sliding bearing and extended in an axial direction. With the arrangement just described, the recessed grooves as axial grooves can be provided at uniformly spaced positions around the inner periphery of the resinous sliding bearing to efficiently trap soil or other foreign matter which gets into a gap space between the outer link portion and the bush.

Further, according to the present invention, the recessed grooves on the resinous sliding bearing are filled with a lubricant oil. The lubricant oil in the recessed grooves on the resinous sliding bearing can be supplied, for example, to sliding surfaces between the bush and the connecting pin as well as to sliding surfaces between the resinous sliding bearing and the connecting pin for the purpose of reducing sliding resistance.

Furthermore, according to the present invention, an outer end face of the resinous sliding bearing is held in abutting engagement with the seal member, and the recessed grooves are each opened at one end on the side of the outer end of the resinous sliding bearing and closed at the other end. With the arrangements just described, intruding soil can be trapped into the recessed grooves through the respective open ends, and trapped soil is blocked at the other closed ends of the respective recessed grooves to prevent its intrusion into a gap space between the bush and connecting pin.

Further, according to the present invention, the seal member is composed of an outer lip portion fitted in an outer link portion of a track link, an inner lip portion slidably held in contact with end faces of the bush and the resinous sliding bearing, and a interconnecting bridge portion connected between the outer and inner lip portions substantially in the shape of letter "M".

With the arrangements just described, when the seal member is fitted in position between an outer link portion of a track link and a bush, the outer lip portion can be resiliently abutted against the outer link portion, while the inner lip portion is resiliently abutted against end faces of the bush and resinous sliding bearing. Accordingly, a gap space between the outer link portion and bush can be sealed up by the seal member in good condition.

Furthermore, according to the present invention, the seal member is composed of an annular outer seal member fitted in an outer link portion of a track link and held in abutting engagement with an end face of a bush, and an annular inner seal member accommodated within the outer seal member and held in abutting engagement with the outer seal member and the resinous sliding bearing.

With the arrangements just described, during a vehicular driving operation, the outer seal member of the seal member, which is located on the side of the resinous sliding bearing, is held in abutting engagement with an end face of the bush, while the inner seal member is held in abutting engagement with the sliding bearing. In this state, a gap space between the outer link portion and bush and a gap space between the outer link portion and sliding bearing can be sealed up in a stable state by the inner and outer seal members, respectively.

On the other hand, according to the present invention, the resinous sliding bearing is formed of at least a synthetic resin material selected from an ultra-high molecular weight polyethylene-base resin, a polyether etherketone-base resin, a polyterafluoroethylene-base resin and a polyimide-base resin. With this arrangement, the sliding bearing which is formed of an ultra-high molecular weight polyethylene-base resin, for example, can enjoy higher resistance to abrasive wear and better lubricative characteristics.

Further, according to the present invention, the hardened surface layer is formed of at least a compound selected from borides, nitrides and carbides. In this case, the hardened surface layer can be enhanced in hardness by using a boride compound layer therefor.

Moreover, according to the present invention, the hardened surface layer on the connecting pin is also likely to be formed of a tungsten carbide-base layer by thermal spray coating. In this case, the hardened surface layer can be enhanced in hardness similarly described above.

BEST MODE FOR CARRYING OUT THE INVENTION

Figure 1:
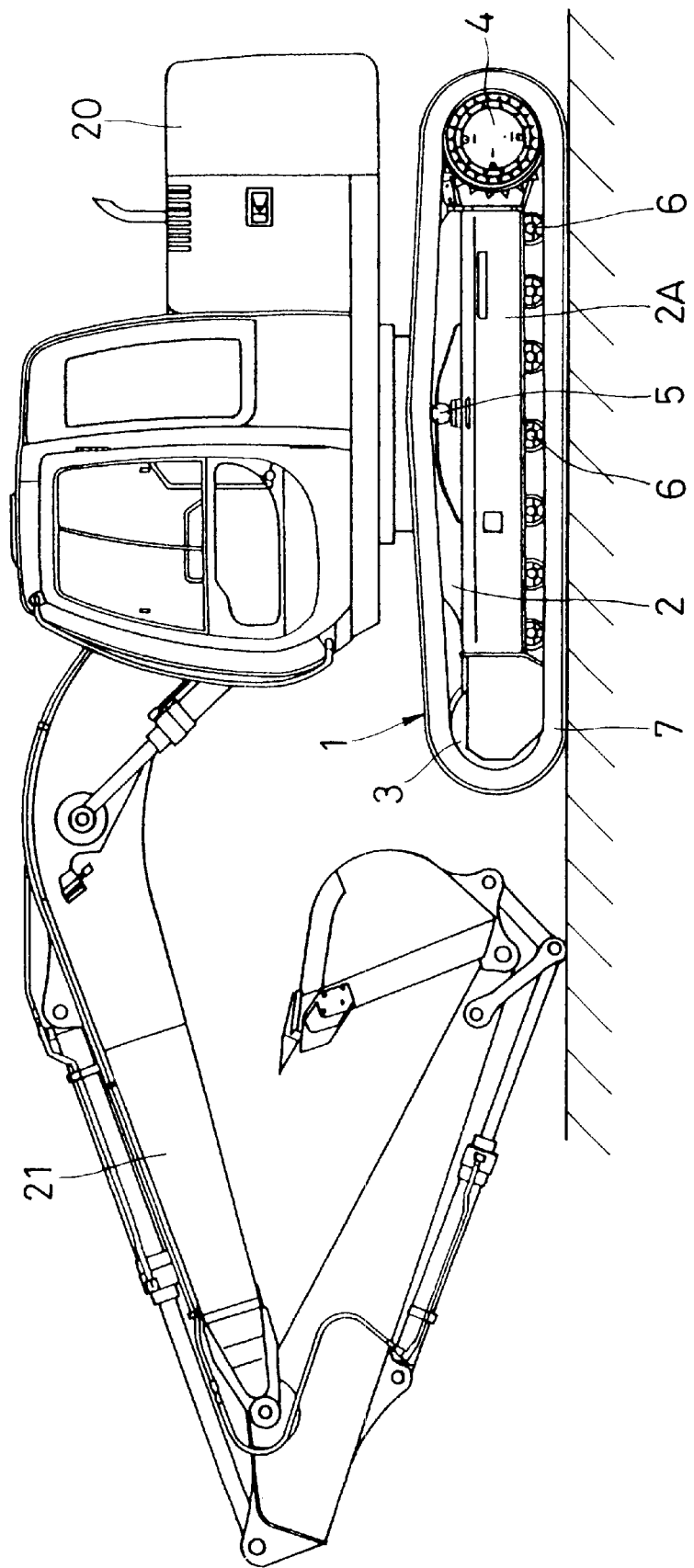
FIG. 1 is an outer view of a hydraulic excavator adopting a first embodiment of the present invention.

Hereafter, the present invention is described more particularly by way of its preferred embodiments which are applied to a hydraulic excavator, with reference to the accompanying drawings.

Shown in FIGS. 1 through 7 is a first embodiment according to the present invention. In these figures, indicated at 1 is a lower structure of the hydraulic excavator. The lower structure 1 includes a track frame 2 having right and left side frames 2A (only one of which is shown in the drawings) which are extended in the longitudinal direction of the vehicle, an idler wheel 3 and a drive sprocket 4 which are provided at the front and rear ends of each side frame 2A of the track frame 2, and a crawler belt 7 which is wrapped around and between the idler wheel 3 and drive sprocket 4 as will be described hereinafter.

Provided on the side frame 2A of the track frame 2 are an upper roller 5 and a plural number of lower rollers 6 to guide the crawler belt 7 on the upper and lower sides of the side frame 2A, respectively.

Indicated at 7 is a crawler belt which is lapped around and between the idler wheel 3 and drive sprocket 4. The crawler belt 7 is largely constituted by track links 8, metal bushes 11, connecting pins 13, resinous sliding bearings 15, annular seal member 17, and track shoes 18, which will be described after. The crawler belt 7 is rotationally driven and rolled forward or backward between and around the idler wheel 3 and drive sprocket 4 by the drive sprocket 4 which is meshing engagement with the bushes 11, which are provided in the connecting portions of the track links 8 of the crawler belt 7.

Figure 4:
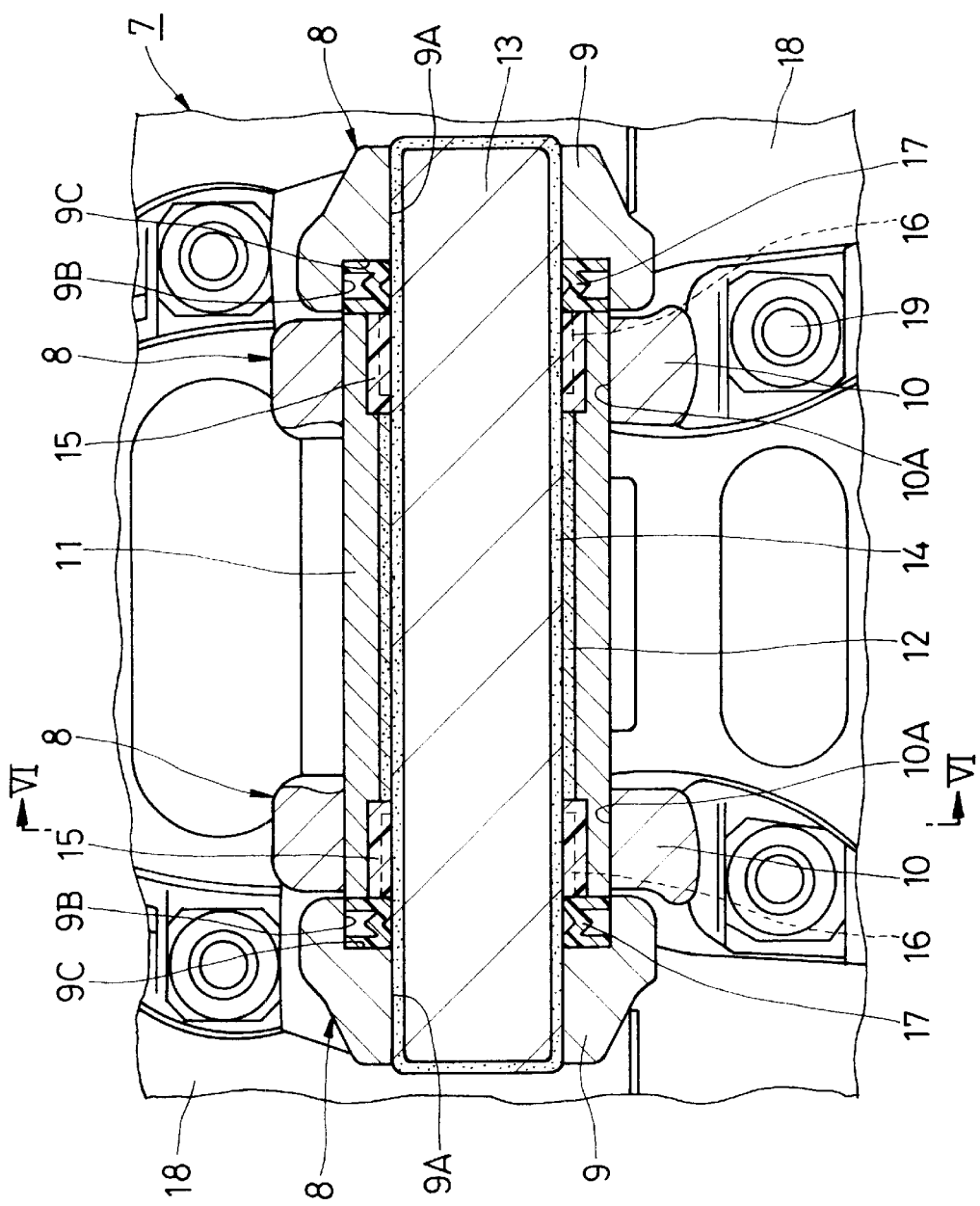
FIG. 4 is a fragmentary sectional view on an enlarged scale of connecting intermediate portions between the track links shown in FIG. 3.
Figure 5:
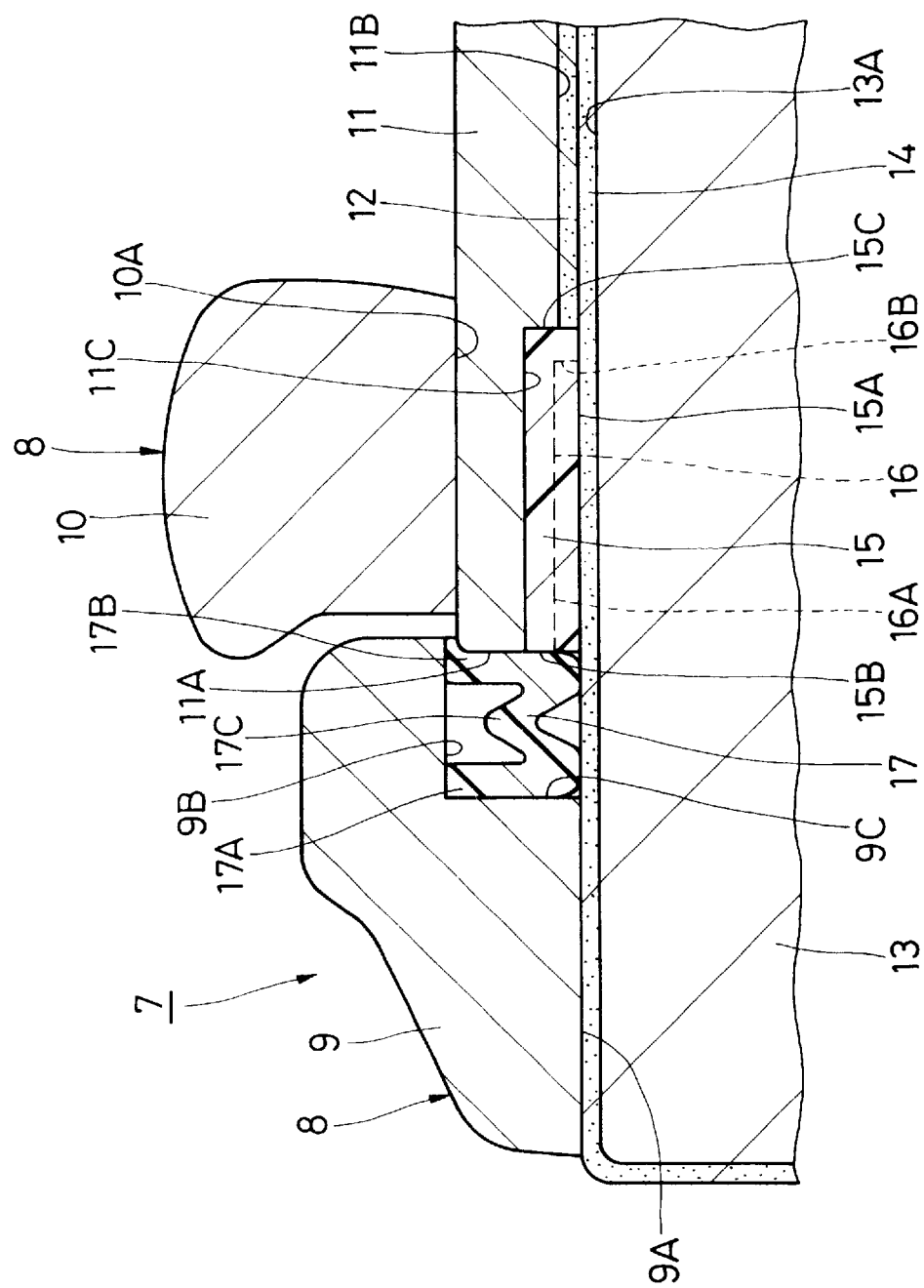
FIG. 5 is an enlarged sectional view of major parts including a hardened surface layer, a resinous sliding bearing and so forth in FIG. 4.

Indicated at 8 are endlessly connected right and left rows of track links which are positioned to confront each other in transversely spaced positions. The track links 8 are each extended in the longitudinal direction of the crawler belt 7. An outer link portion 9 is formed at one longitudinal end of each track link unit 8. As shown in FIGS. 4 and 5, the outer link portion 9 is provided with a pin receiving bore 9A to receive a connecting pin 13, a seal fitting bore 9B which is formed by concentrically spreading inner peripheral surface of an inner end portion of the pin receiving bore 9A on the side of a metal bush 11 to receive an annular seal member 17, which will be described after, and an inner end face 9C which is formed as a stepped wall between the pin receiving bore 9A and the seal fitting bore 9B at the deep position of seal fitting bore 9B.

Further, an inner link portion 10 is formed at the other longitudinal end of each unit of the track links 8. A bush receiving bore 10A is formed in the inner link portion 10 to receive therein a metal bush 11 as described below.

Denoted at 11 are metal bushes which are interposed between the inner link portions 10 of the right and left track links 8. Each one of the bushes 11 is formed in a hollow cylindrical shape by the use of steel material, for example, such as carbon steel, alloyed tool steel or the like, and arranged to receive a connecting pin 13 on the inner peripheral side thereof. In order to facilitate generation of a nitride or nitrides, the steel material for the metal bushes 11 is preferred to be of the sort which contains at least one of chromium, molybdenum, titanium, zirconia, niobium and boron as its component.

Opposite end portions of each metal bush 11 are placed in the bush receiving bores 10A of inner link portions 10 of the right and left track links by press-in fitting to connect between the inner link portions 10. Each one of the metal bushes 11 is provided with end faces 11A at the opposite ends which are received and located in the seal fitting bores 9B of an outer link portions 9 in such a way as to oppose the inner end face 9C through a gap space. Further, the metal bushes 11 are each provided with an inner peripheral surface 11B and, as will be described in greater detail hereinafter, a hardened surface layer 12 is formed on the inner peripheral surface 11B to serve as a sliding surface to be engaged with the connecting pin 13.

In this instance, sliding bearing receptacle grooves 11C of a diameter larger than the inner peripheral surface 11B of the metal bush 11 are formed at the opposite ends of the inner peripheral surface 11B of the metal bush 11 to receive resinous sliding bearings 15, which will be described after.

Indicated at 12 is a hardened surface layer on the side of bush, that is, a hardened surface layer which is provided on the inner peripheral surface 11B of the metal bush 11. This hardened surface layer 12 is formed around the entire inner peripheral surface 11B of the metal bush 11 of steel material, and in the form of a layer of a compound which is harder than dirt or soil.

In this case, the hardened surface layer 12 is formed by a nitriding treatment, a boriding treatment or a carburizing treatment of the bush surface to produce a nitride, a boride or a carbide thereon. In this instance, the hardened surface layer 12 may be arranged to contain one of niride, boride and carbide compounds or to contain two or more than two such compounds in combination. However, in consideration of resistance to abrasive wear of the hardened surface layer 12, it is desirable to adopt a nitriding treatment or a boriding treatment in forming the hardened surface layer.

Indicated at 13 are connecting pins which transversely connect the right and left track links 8. The connecting pins 13 are each formed in a rod-like shape by the use of steel material such as carbon steel, alloyed tool steel or the like. Similarly to the metal bushes 11, the connecting pins 13 are preferably formed of steel material which contains at least chromium, molybdenum, titanium, zirconia, niobium or boron as a component for encouraging generation of a nitride. Further, through the hardened surface layer 14, the outer peripheral surface 13A of the connecting pin 13 is slidably fitted in the inner peripheral side of the metal bush 11 and resinous sliding bearing 15, which will be described hereinafter. Moreover, opposite ends of the connecting pin 13 are fitted in the pin receiving bores 9A of outer link portions 9 of the right and left rack links by press-in fitting to connect the outer link portions 9 transversely to each other.

Denoted at 14 is a hardened surface layer on the side of connecting pin, that is, a hardened surface layer which is provided on the outer peripheral surface 13A of each connecting pin 13. Similarly to the above-described hardened surface layer 12, this hardened surface layer 14 is formed of a compound which is higher in hardness than dirt or soil grains. Also in this case, as the hardened surface layer 14, a nitride, a borate and/or a carbide is produced on the surface of the connecting pin 13 by a nitriding, boriding or carburizing treatment. In forming the hardened surface layer 14, at least one compound can be selected from nitride, borate and carbide. Otherwise, a tungsten carbide (WC) type thermal spray coating film may be formed on and around the outer peripheral surface 13A of the connecting pin 13 by the use of a flame spray coating method such as high speed gas flame spray coating.

Figure 7:
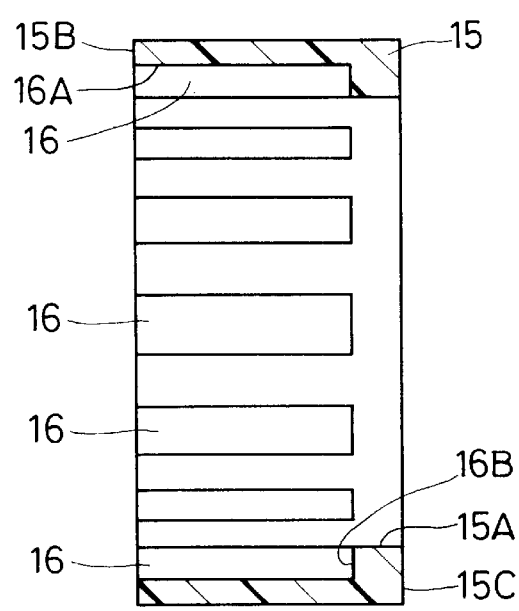
FIG. 7 is a sectional view of the resinous sliding bearing, taken in the direction of arrows VII—VII in FIG. 6.

Indicated at 15 are right and left resinous sliding bearings which are provided in transversely spaced positions on the inner periphery of the metal bush 11. As shown in FIGS. 4 and 7, these resinous sliding bearings 15 are formed in a cylindrical shape by the use of a synthetic resin material which is lower than the metal bush 11 in hardness and at the same time has satisfactory properties in resistance to abrasive wear and slidability.

More specifically, the resinous sliding bearings 15 are formed of one synthetic resin material or more than two synthetic resin materials selected from ultra high molecular weight polyethylene resin, polyether ether ketone resin, polytetrafluoroethylene resin and polyimid resin.

The resinous sliding bearings 15 are each placed in a sliding bearing receptacle groove 11C of the metal bush 11 by press-in fitting, and the inner peripheral surface 15A of each resinous sliding bearing 15 provides a sliding surface for the connecting pin 13. Further, each resinous sliding bearing 15 has an outer end face 15B which is located at and substantially flush with an end face 11A either at right or left open ends of the metal bush 11 for abutting engagement with an annular seal member 17. Provided at the inner end of the resinous sliding bearing 15, away from the outer end face 15B, is an inner end face 15C which is abutted against an inner end of the sliding bearing receptacle groove 11C.

Figure 6:
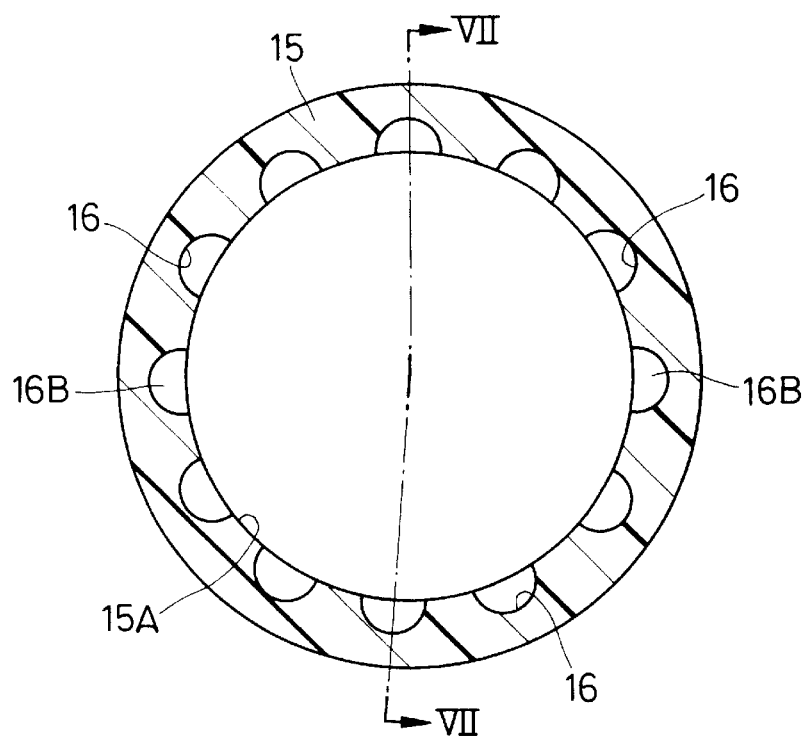
FIG. 6 is an enlarged sectional view of the resinous sliding bearing, taken in the direction of arrows VI—VI in FIG. 4.

Indicated at 16 are a plural number of channel-like recessed grooves which are provided axially on the inner periphery of each resinous sliding bearing 15 at angularly spaced positions in the circumferential direction. As shown in FIGS. 5 to 7, the recessed grooves 16 are in the form of channel of semi-circular shape in cross-section and extended in the transverse direction (in the axial direction) along the inner periphery of the resinous sliding bearing 15 as axial grooves.

In this instance, one end of each recessed grooves 16 is opened to the outer end face 15B of the resinous sliding bearing 15 as an open end 16A while the other end on the side of the inner end face 15C of the resinous sliding bearing 15 is closed as a closed end 16B. These recessed grooves 16 are provided to trap in soil or other foreign matter which might intrude into a gap space or interstice between the connecting pin 13 and the resinous sliding bearing 15.

Further, the recessed grooves 16 are arranged to function also as an oil reservoir for pooling grease or a lubricant oil therein, maintaining a lubricated state between the metal bush 11 and the connecting pin 13 and between the resinous sliding bearing 15 and the connecting pin 13.

Indicated at 17 are right and left annular seal members which are provided on the outer periphery of the connecting pin 13 between an outer link portion 9 of each track link 8 and an opposing end of the metal bush 11. The annular seal members 17 are each constituted by a seal ring of M-shape in cross-section, which is formed of a resilient material, for example, a resilient material such as urethane rubber, nitrile rubber or the like.

In this instance, each annular seal member 17 is constituted by an annular outer lip portion 17A which is fitted in the seal fitting bore 9B of the outer link portion 9, an annular inner lip portion 17B which is slidably abutted against end faces 11A and 15B of the metal bush 11 and the resinous sliding bearing 15, and an interconnecting bridge portion 17C of V-shape in cross-section which is bridged between the outer and inner lip portions 17A and 17B to interconnect same integrally with each other.

Further, the outer lip portion 17A of the annular seal member 17 is fitted into the seal fitting bore 9B of the outer link portion 9 as far as an inner end face 9C of the latter, and abutted against the inner end face 9C with a certain range of compressive resilience. On the other hand, the inner lip portion 17B on the side of bush is held in contact with the end faces 11A of the metal bush 11 and the outer end face 15B of the resinous sliding bearing 15 with a predetermined range of compressive resilience. The annular seal member 17 functions to block intrusion of soil or other foreign matter into a gap space or interstice between the connecting pin 13 and the resinous sliding bearing 15, and at the same time to prevent leakage of grease from the recessed grooves 16 to the outside.

Figure 2:
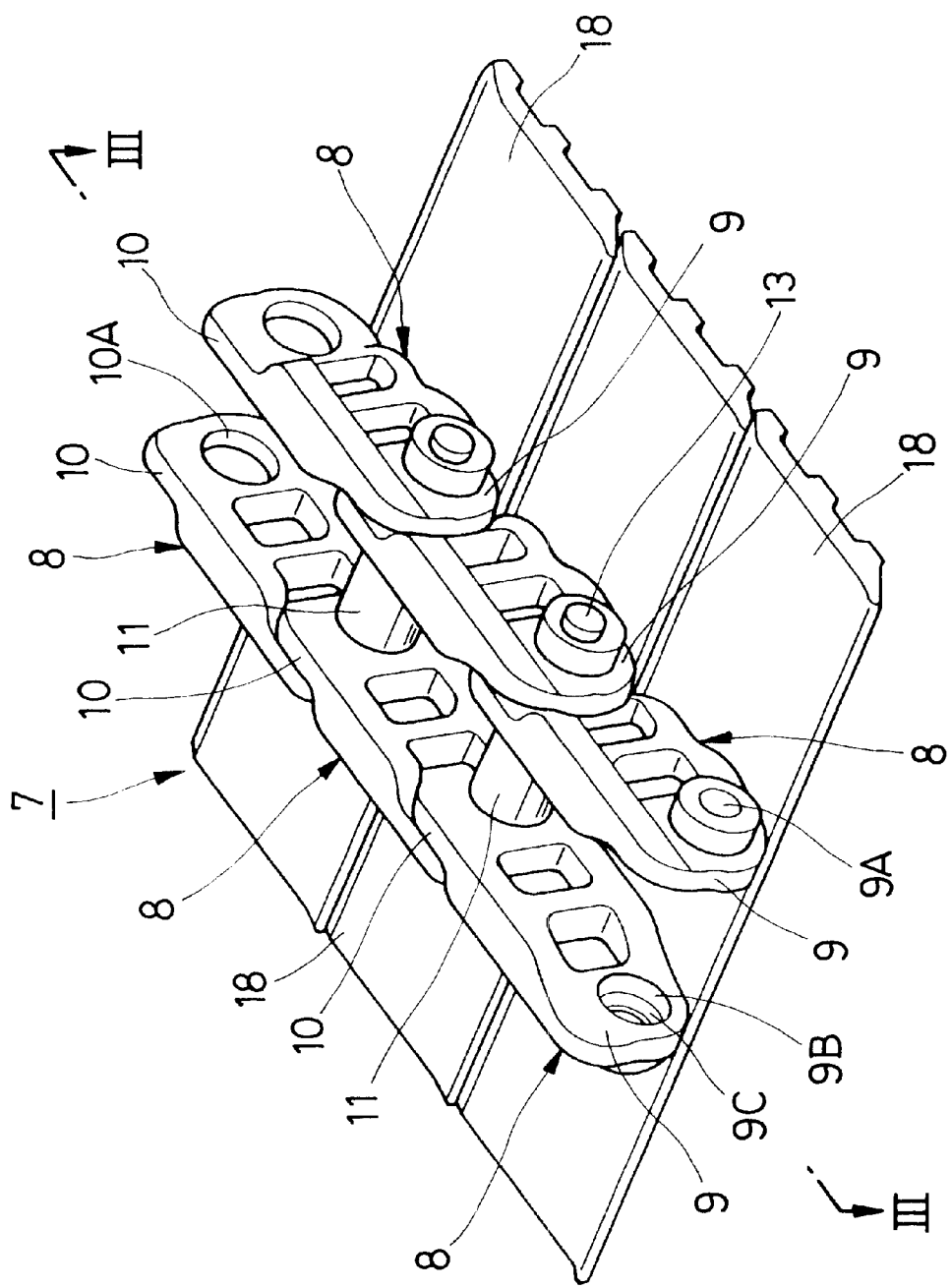
FIG. 2 is a fragmentary perspective view on an enlarged scale of a crawler belt shown in FIG. 1.
Figure 3:
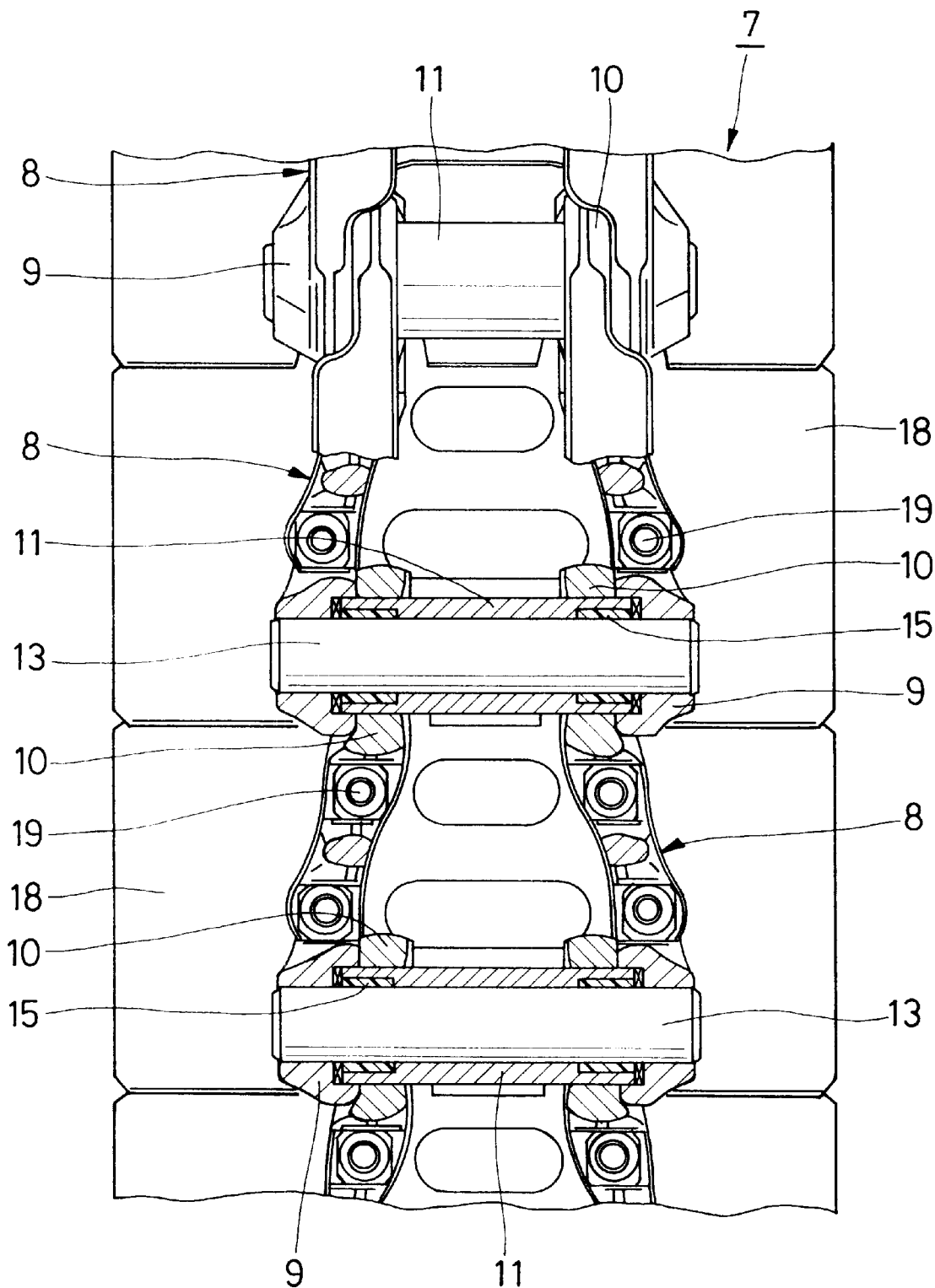
FIG. 3 is a partly cutaway plan view of the crawler belt, taken in the direction of arrows III—III in FIG. 2.

Denoted at 18 are track shoes which are made of metal plates and provided on the right and left track links 8. As shown in FIGS. 2 and 3, the respective tack shoes 18 are securely fixed to the outer side of the track links 8 by means of a plural number of bolts 19 or the like to connect the right and left track links 8 integrally to each other and to form treading surfaces for the crawler belt 7.

Further, indicated at 20 is an upper structure which is rotatably mounted on the lower structure 1, and at 21 is a working mechanism which is provided on a front portion of the upper structure 20 for lifting a working attachment up and down.

In operation of the hydraulic excavator with the above-described arrangements according to the present embodiment, each crawler 7 is rolled on in the forward or reverse direction between and around the idler wheels 3 and drive sprockets 4 upon rotationally driving the drive sprocket 4 from a hydraulic motor or the like (not shown) to put the vehicle body in travel in the forward or reverse direction.

While the crawler belts 7 are being put in rolling movements in the manner as described above, gap spaces or clearances between the outer link portions 9 of the track links 8 and the metal bushes 11 are sealed up by the respective annular seal members 17 thereby to block soil or other foreign matter which might otherwise get between the metal bushes 11 and the connecting pins 13.

The annular seal members 17 which are formed of a resilient synthetic resin material undergo deteriorations during use over a long period of time, particularly deteriorations in resilient force. In addition, in some cases, it becomes necessary to drive the hydraulic excavator itself by way of the crawler belts 7 for transferring same from a working site to a garage or other manageable place. In such a case, irregular loads can be exerted on the annular seal members 17 between the track links 8 and the metal bushes 11 to an unexpected degree to accelerate deteriorations of their seal capacity or strength.

With deteriorations in seal capacity or strength of the annular seal members 17, it becomes more likely for soil or dirt to get between the outer link portions 9 and the metal bushes 11 through the annular seal members 17 while the hydraulic excavator is running as a vehicle. Especially when the excavator is driven on a muddy surface, it is very likely that mud gets between the outer link portions 9 and the metal bushes 11.

However, according to the present embodiment, resinous sliding bearings 15 which are lower in hardness than the metal bushes 11 are provided on and around the inner periphery of the metal bushes 11. Therefore, should soil or mud get between the outer link portions 9 and the metal bushes 11 through the annular seal members 17, part of intruding soil or mud is trapped in the inner peripheral surface 15A of the resinous sliding bearing 15 to block soil which would otherwise tend to intrude between the sliding surfaces of the metal bush 11 and the connecting pins 13.

Besides, according to the present embodiment, a plural number of recessed grooves 16 are provided at angularly spaced positions around the inner periphery of the resinous sliding bearing 15. Each one of the recessed-grooves 16 is open at one end 16A and closed at the other end 16B, and the open end 16A is located face to face with an annular seal member 17.

Therefore, a major part of soil which comes in toward a gap space or clearance between the connecting pin 13 and the resinous sliding bearing 15 can be effectively trapped into the recessed grooves 16 through its respective open end 16A to prevent the soil from getting between the metal bush 11 and the connecting pin 13. In addition, abraded particles which may occur on sliding surfaces of the connecting pin 13 and the resinous sliding bearing 15 can also be trapped in the recessed grooves 16.

Further, according to the present embodiment, the hardened surface layers 12 and 14 of a compound such as nitride, boride or carbide, which is higher in hardness than the soil, are provided on the inner peripheral surface 11B of the metal bush 11 and on the outer peripheral surface 13A of the connecting pin 13, respectively. Therefore, should soil get between sliding surfaces of the metal bush 11 and the connecting pin 13 through the resinous sliding bearing 15, soil grains can be crushed between the hardened surface layers 12 and 14 to prevent abrasive wear of the metal bush 11 and the connecting pin 13. Besides, crushed soil can be removed from the hardened surface layers 12 and 14 and stored in the recessed grooves 16 by letting same escape from the hardened surface layers 12 and 14 into the recessed grooves 16 through a clearance between the connecting pin 13 and the resinous sliding bearing 15.

Thus, according to the present embodiment, the resinous sliding bearing 15 contributes to solve the problem of soil accumulation which would otherwise occur between the metal bush 11 and the connecting pin 13, while maintaining the slide resistance between the metal bush 11 and the connecting pin 13 at a low level to ensure smooth turning movements of the crawler belts 7 over an extended period of time.

Further, since grease or a lubricant is filled in the recessed grooves 16 on the resinous sliding bearings 15 as described hereinbefore, sliding resistance between the metal bush 11 and the connecting pin 13 as well as sliding resistance between the resinous sliding bearing 15 and the connecting pin 13 can be maintained at a lowered level by lubrication to guarantee smooth and stable turning movements of the crawler belt 7 even in an initial stage of a vehicular driving operation.

On the other hand, in the case of the present embodiment of the invention, the hardened surface layer 12 on the side of bush and the hardened surface layer 14 on the side of connecting pin are formed of the same compound. Therefore, generally speaking, the two hardened surface layers 12 and 14 are considered to be more susceptible to cohesion.

However, according to the present embodiment of the invention, the resinous sliding bearing 15 of a different constituent in comparison with the hardened surface layer 14, is provided on the inner periphery of the metal bush 11 separately from the hardened surface layer 12 and held in sliding contact with the connecting pin 13, and grease or a lubricant is supplied to a gap space or clearance between the hardened surface layers 12 and 14 from the recessed grooves 16 on the resinous sliding bearing 15 as described hereinbefore.

Therefore, the provision of the resinous sliding bearing 15 with a grease supply contributes to prevent cohesion and scratching bruises which might otherwise occur to the hardened surface layers 12 and 14 and to suppress abnormal metallic noises which would otherwise be produced by the metal bush 11 and the connecting pin 13. Alternatively, cohesion of the hardened surface layers 12 and 14 can be prevented more effectively by employing different composition ratios for the hardened surface layers 12 and 14.

Furthermore, the provision of the resinous sliding bearing 15 on the inner periphery of the metal bush 11 functions to absorb flexural deformations of the metal bush 11 which take place when a load is exerted thereon from the side of the drive sprocket 4 during a vehicular traveling operation, thus suppressing deformations of the connecting pin 13 and as a result enhancing durability of the latter.

Moreover, the provision of the hardened surface layers 12 and 14 on the inner peripheral surface 11B of the metal bush 11 and on the outer peripheral surface 13A of the connecting pin 13 function to suppress flexural deformations of the metal bush 11 and the resinous sliding bearing 15 to a minimum when a load is exerted on the metal bush 11 as mentioned hereinbefore.

On the other hand, each one of the annular seal members 17 is constituted by the outer lip portion 17A on the side of track link, the inner lip portion 17B on the side of metal bush, and the interconnecting bridge portion 17C which is arranged to interconnect the outer and inner lip portions 17A and 17B in the shape of letter "M". Therefore, the interconnecting bridge portion 17C is capable of resilient deformations between the outer lip portion 17A on the side of track link and the inner lip portion 17B on the side of metal bush.

Consequently, the outer lip portion 17A of the annular seal member 17 can be resiliently abutted against the inner end face 9C of the outer link portion 9 while the inner lip portion 17B on the side of bush is resiliently abutted against the end face 11A of the metal bush 11 and the end face 15B of the resinous sliding bearing 15, to seal up gap spaces or clearances between the outer link portion 9 and the metal bush 11 in a reliable manner. The annular seal member 17 of the above arrangements can block soil or other foreign matter which tends to get into a gap space between the connecting pin 13 and the resinous sliding bearing 15 from outside and can prevent grease in the recessed grooves 16 from leaking to the outside.

Figure 8:
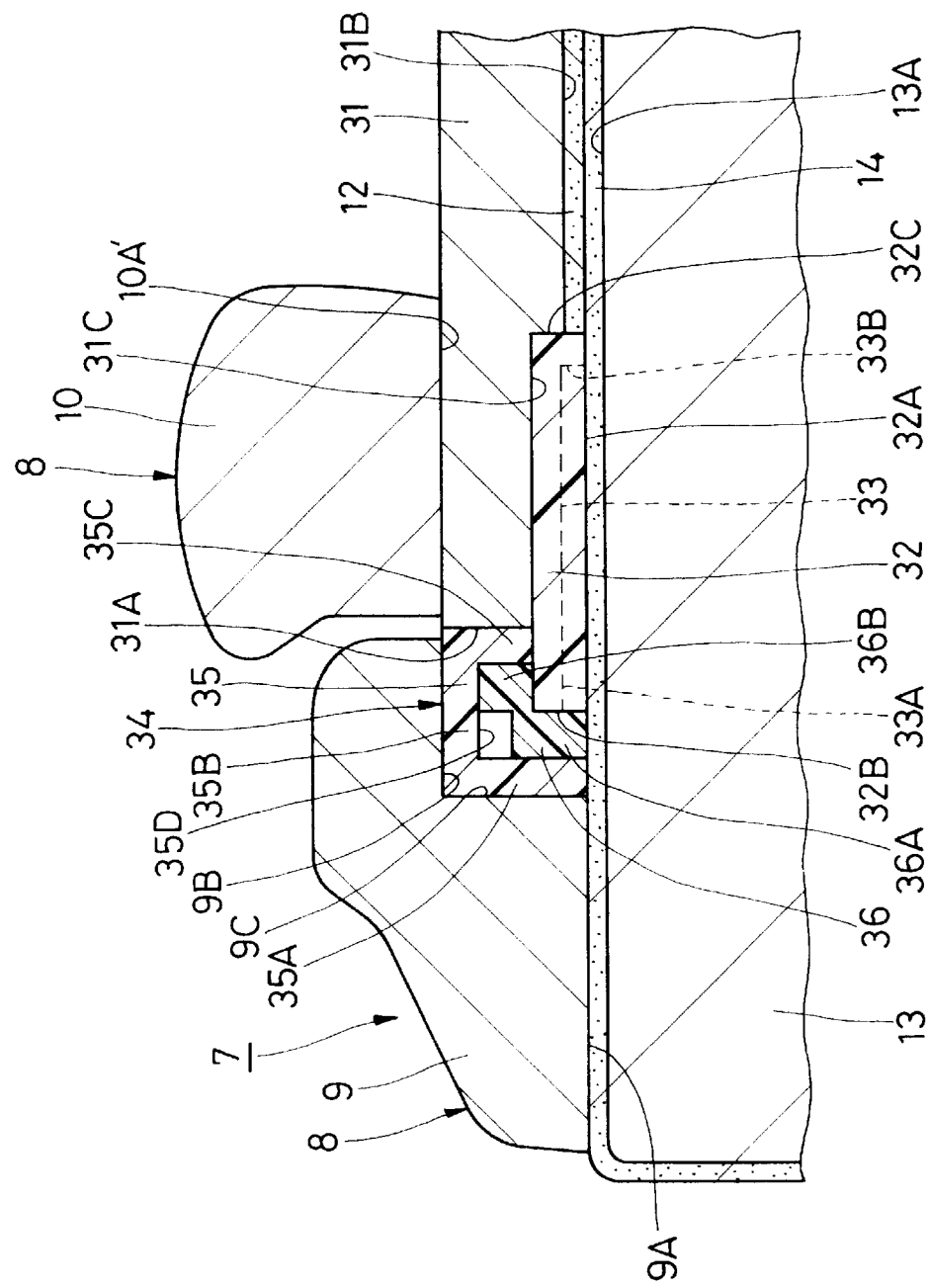
FIG. 8 is an enlarged sectional view similar to FIG. 5, showing on an enlarged scale major parts in a second embodiment of the present invention, including a hardened surface layer of a crawler belt, a resinous sliding bearing and so forth.

Turning now to FIG. 8, there is shown a second embodiment of the present invention, which has features in that a double layer seal is employed as a crawler belt seal, including an outer seal member which is fitted in a seal fitting bore of an outer link portion and an inner seal member which is fitted into a resinous bush from outer side, the outer and inner seal members being put in sliding movements relative to each other during vehicular driving operations of a machine.

In the following description of the second embodiment, those component parts which are common or identical with counterparts in the foregoing first embodiment are designated by common or same reference numerals to avoid repetitions of same explanations. By the way, in the case of the following second embodiment, bush receiving bores 10A' which are provided in inner link portions 10 of track links 8 are slightly smaller in diameter as compared with the bush receiving bores 10A in the foregoing first embodiment.

Indicated at 31 are metal bushes which are employed in this embodiment of the invention. Similarly to the metal bushes 11 of the first embodiment, each one of the metal bushes 31 includes an end face 31A, an inner peripheral surface 31B and right and left sliding bearing receptacle grooves 31C (only one of which is shown in the drawing). Further, the metal bush 31 is placed in a bush receiving groove 10A' of an inner link portion 10 by press-in fitting.

Indicated at 32 are resinous sliding bearings according to the present embodiment. The resinous sliding bearings 32 are placed in the sliding bearing receptacle grooves 31C of the metal bush 31. Similarly to the resinous sliding bearing 15 in the foregoing first embodiment, each one of the resinous sliding bearings 32 includes an inner peripheral surface 32A, an end face 32B to be abutted against a double layer seal 34, and another end face 32C to be abutted against a root portion of the sliding bearing receptacle groove 31C. Further, a plural number of recessed grooves 33 (only one of which is shown in the drawing) are provided on the inner periphery of the resinous sliding bearing 32. Each one of the recessed grooves 33 is provided with the open end 33A on the side of the end face 32B and the closed end 33B on the side of the end face 32C.

However, the resinous sliding bearings 32 of this embodiment differs from the counterpart in the first embodiment in that its outer end face 32B is projected from the end face 31A of the metal bush 31 in the transverse direction of the crawler belt, and fitted in the seal fitting bore 9B of the outer link portion 9.

Indicated at 34 is a right and left double layer seal as a seal member(only one of which is shown in the drawing) according to the present embodiment, which are interposed between the outer link portions 9 of track links 8 and metal bushes 11. Each one of the double layer seal 34 is constituted by an outer seal member 35 which is fitted on a circumferential portion of the connecting pin 13 within the seal fitting bore 9B of an outer link portion 9, and an inner seal member 36 which is located within the outer seal member 35 and fitted on a circumferential portion of the resinous sliding bearing 32 in the proximity to the outer end face 32B of the latter.

In this instance, the outer seal member 35 of the double layer seal 34 is an annular seal which is formed in an inverted U-shape in cross-section by the use of a synthetic resin material, for example, by the use of urethane rubber or the like. Further, the outer seal member 35 is constituted by a first annular portion 35A which is abutted against an inner end face 9C of the outer link portion 9, a tubular body portion 35B which is connected angularly to the first annular portion 35A substantially in L-shape and fitted in the seal-fitting bore 9B of the outer link portion 9, a second annular portion 35C which is angularly connected to the tubular body portion 35B substantially in L-shape and placed at the outer periphery side of the resinous sliding bearing 32 and slidably abutted against the end face 31A of a metal bush 31, and an inner seal receptacle groove 35D which is defined by the above-mentioned first and second annular portions 35A and 35C and the inner periphery of the tubular body portion 35B.

On the other hand, the inner seal member 36 is an annular seal which is formed substantially in a L-shape in cross-section by the use of a synthetic resin material, for example, by the use of polytetrafluoroethylene or the like, and accommodated in the inner seal receptacle groove 35D on the inner peripheral side of the outer seal member 35. Further, the inner seal member 36 is constituted by a first annular portion 36A which is slidably abutted against the end face 32B of the resinous sliding bearing 32 and the first annular portion 35A of the outer seal member 35, and a second annular portion 36B which is formed integrally with and radially outward of the first annular portion 36A and fitted on an outer peripheral portion of the resinous sliding bearing 32 in abutting engagement with the tubular body portion 35B and the second annular portion 35C of the outer seal member 35.

During a vehicular traveling operation, the inner seal member 36 of the double layer seal 34, which is provided on the side of the resinous sliding bearing 32, is slidable relative to the outer seal member 35 on the side of the outer link portion 9. In this state, the outer seal member 35 is held in sliding engagement with the end face 31A of the metal bush 31, while the inner seal member 36 is held in sliding engagement with the resinous sliding bearing 32, thereby sealing up a gap or interstice between the outer link portion 9 and the metal bush 31 and a gap or an interstice between the outer link portion 9 and the resinous sliding bearing 32 as well.

Thus, in the case of the present embodiment with the arrangements as described above, it is possible to produce substantially the same effects as the foregoing first embodiment. Especially in the case of the present embodiment employing the double layer seal 34 which is composed of the outer seal member 35 and the inner seal member 36, a contacting surface of the end face 31A of the metal bush 31 with the annular portion 35C of the outer seal member 35 as well as contacting surfaces of the first and second annular portions 35A and 35C and tubular body portion 35B with the inner seal member 36 and a contacting surface of the inner seal member 36 with the end face 32B of the resinous sliding bearing 32 can be used as seal surfaces. It follows that seal surfaces can be arranged over a longer distance in total and in the fashion of a labyrinth, that is to say, the double layer seal 34 which is improved in seal capacity and yet simple in construction can be formed simply the use of the outer and inner seal members 35 and 36.

Figure 9:
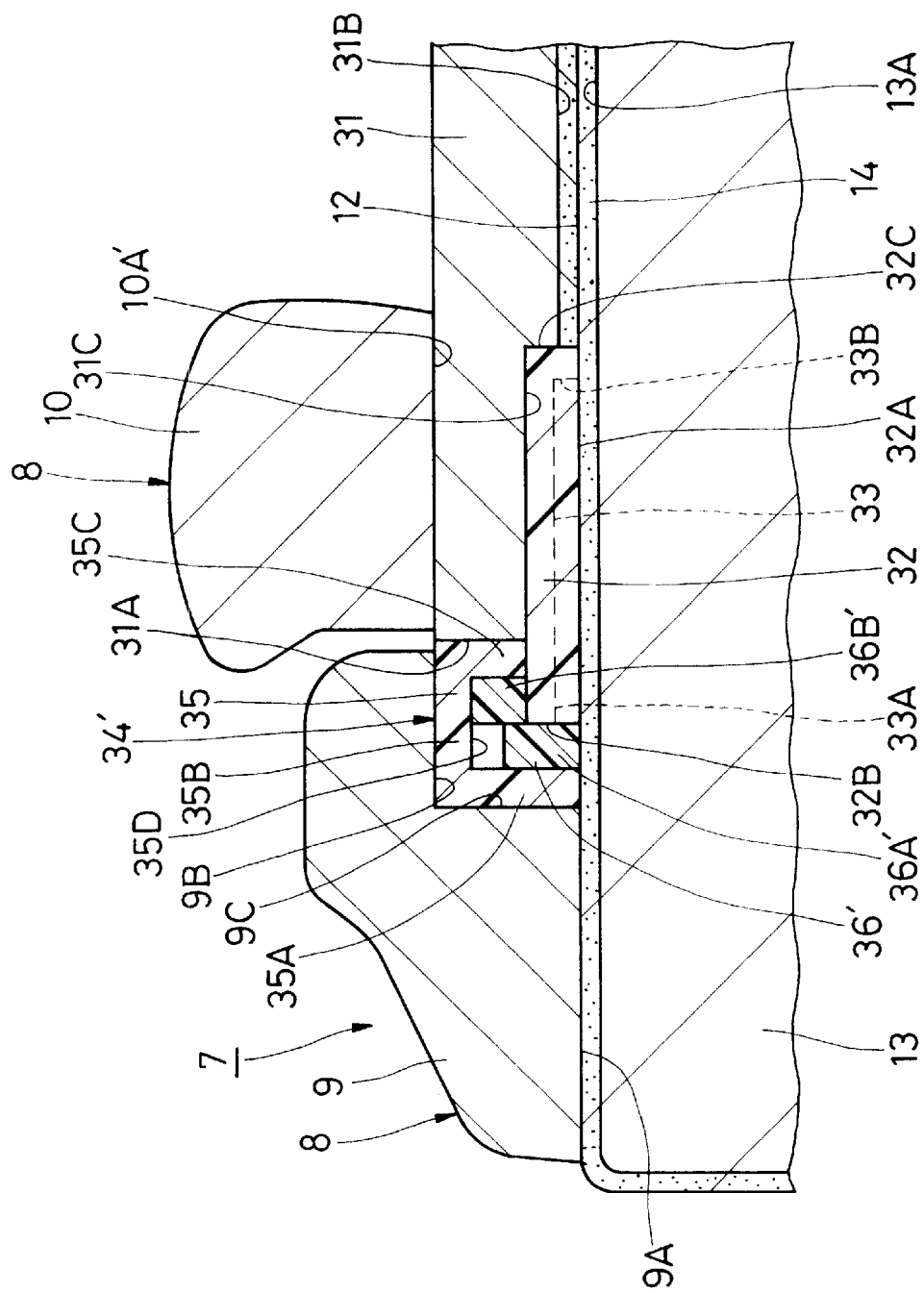
FIG. 9 is an enlarged sectional view similar to FIG. 5, showing on an enlarged scale major parts in a modification according to the present invention, including a hardened surface layer of a crawler belt, a resinous sliding bearing and so forth.

In the above-described second embodiment of the invention, the inner seal member 36 of the double layer seal 34 is constituted by one part. However, it is possible to employ a double layer seal 34' which is shown in FIG. 9 as a modification. More particularly, in this case of the double layer seal 34', an inner seal member 36' which is accommodated in an inner seal receptacle groove 35D of an outer seal member 35 is constituted by two parts, i.e., a first annular portion 36A' and a second annular portion 36B'.

Further, in the case of the first embodiment, a couple of resinous sliding bearings 15 are provided in transversely spaced positions on the inner periphery of the metal bush 11. However, it is to be understood that the present invention is not limited to this particular arrangement. Namely, if desired, the resinous bush may be provided either in one position or in three transversely spaced positions on the inner periphery of the metal bush.

Moreover, in the foregoing embodiment, by way of example the crawler type vehicle of the present invention has been described as a hydraulic excavator. However, the present invention is not limited to the particular example shown. For example, the present invention can be similarly applied to hydraulic cranes or other crawler type vehicles.

INDUSTRIAL APPLICABILITY

As clear from the foregoing detailed description, the crawler belt according to the present invention is provided with a seal member to seal up a gap space between an outer link portion of a track link and a bush, a hardened surface layer formed at least on an inner peripheral surface of the bush or on an outer peripheral surface of a connecting pin to impart higher hardness thereto, a tubular resinous sliding bearing formed of a synthetic resin material lower in hardness than the bush and fitted in a sliding bearing receptacle groove on the inner peripheral surface of the bush. Accordingly, should soil or other foreign matter get between the outer link portion and the bush through the seal member, it can be trapped on an inner peripheral surface of the sliding bearing in an embedded state to prevent soil from accumulating and getting stuck between sliding surfaces of the bush and connecting pin. Thus, it becomes possible to maintain the sliding resistance between the bush and connecting pin at a low level and to turn around the crawler belt smoothly over a long period of time. In addition, even in case soil gets between the bush and connecting pin, the hardened surface layer or layers prevents abrasive wear of the bush or connecting pin to guarantee higher durability of the crawler belt.

What is claimed is:

1. A crawler belt including endlessly connected right and left track links each formed with an outer link portion and an inner link portion at opposite longitudinal ends thereof, bushes transversely located between said right and left track links in such a way as to connect inner link portions of the respective track links with each other, connecting pins inserted in said bushes and having opposite end portions fitted in and connected to said outer link portions of the respective track links, and seal members fitted on circumferential surfaces of said connecting pins at positions between said outer link portions of said track links and said bushes, characterized in that said crawler belts comprises:
- a sliding bearing receptacle groove provided on and around an inner peripheral surface of each bush, and said sliding receptacle groove having a diameter larger than said inner peripheral surface;
- a hardened surface layer provided at least on an inner peripheral surface of said bush or on an outer peripheral surface of said connecting pin to impart higher hardness thereto; and
- a resinous sliding bearing formed of a tubular synthetic resin material lower in hardness than said bush and fitted in said sliding bearing receptacle groove of said bush, said resinous sliding bearing having a slide surface on the inner peripheral side thereof in sliding contact with said connecting pin.

2. A crawler belt as defined in claim 1, wherein said sliding bearing receptacle groove is provided at least in right and left end portions of said bush, and said resinous sliding bearing is fitted in each one of right and left sliding bearing receptacle grooves.

3. A crawler belt as defined in claim 1, wherein said resinous sliding bearing is provided with recessed grooves on the inner peripheral side thereof for trapping thereon foreign matter coming in from outside.

4. A crawler belt as defined in claim 3, wherein a plural number of said recessed grooves are provided at intervals around inner periphery of said resinous sliding bearing and extended in an axial direction.

5. A crawler belt as defined in claim 3, wherein said recessed grooves on said resinous sliding bearing are filled with a lubricant oil.

6. A crawler belt as defined in claim 4, wherein an outer end face of said resinous sliding bearing is held in abutting engagement with said seal member, and said recessed grooves are each opened at one end on the side of said outer end of said resinous sliding bearing and closed at the other end.

7. A crawler belt as defined in claim 1, wherein said seal member is composed of an outer lip portion fitted in an outer link portion of a track link, an inner lip portion slidably held in contact with end faces of said bush and said resinous sliding bearing, and a interconnecting bridge portion connected between said outer and inner lip portions substantially in the shape of letter "M".

8. A crawler belt as defined in claim 1, wherein said seal member is composed of an annular outer seal member fitted in an outer link portion of a track link and held in abutting engagement with an end face of a bush, and an annular inner seal member accommodated within said outer seal member and held in abutting engagement with said outer seal member and said resinous sliding bearing.

9. A crawler belt as defined in claim 1, wherein said resinous sliding bearing is formed of at least a synthetic resin material selected from an ultra-high molecular weight polyethylene-base resin, a polyether etherketone-base resin, a polyterafluoroethylene-base resin and a polyimide-base resin.

10. A crawler belt as defined in claim 1, wherein said hardened surface layer is at least formed of a compound selected from borides, nitrides and carbides.

11. A crawler belt as defined in claim 1, wherein said hardened surface layer on said connecting pin is a thermal spray coating layer of tungsten carbide.

* * * * *